Patented Nov. 17, 1942

2,302,608

UNITED STATES PATENT OFFICE 2,302,608

AZEOTROPIC DISTILLATION

Edmund Field, Wilmington, Del., assignor to E. I. du Pont de Nemours & Company, Wilmington, Del., a corporation of Delaware No Drawing. Application August 22, 1940, Serial No. 353,673

2 Claims. (Cl. 202—42)

This invention relates to a method for separating substances which either boil closely together or form binaries such that separation cannot be achieved by simple fractional distillation. More particularly, this invention relates to the separation of cyclohexane from benzene and is an improvement upon U. S. Patent 2,212,810, which relates to the same separation.

It is an object of this invention to provide a method for separating closely-boiling substances or substances which form azeotropes where separation by fractional distillation is difficult or impractical. It is a further object of this invention to provide a method for separating cyclohexane from benzene. It is an additional object of this invention to increase the efficiency of separation of cyclohexane from benzene by altering the composition of the acetone-cyclohexane azeotrope. Other objects and advantages of the invention will be apparent from the following specification.

I have found, as described in U. S. Patent 2,212,810, that cyclohexane can be removed from a mixture containing cyclohexane and substances of similar boiling point, such as benzene (B. P. 80.1° C.) (which cannot be distilled ordinarily from cyclohexane, B. P. 80.8° C.) by adding acetone to the mixture and distilling. As described in the patent previously referred to, I have found that acetone forms a binary azeotrope with cyclohexane (67.3% acetone by weight) which boils at a lower temperature (53.1° C) than either acetone or any benzene-cyclohexane mixture and a weight ratio of acetone to cyclohexane of at least 2.0:1.0 is preferable when separating these substances by distilling under a pressure of one atmosphere.

According to the present invention, cyclohexane can be removed from a mixture containing cyclohexane and substances of a similar boiling point by adding acetone and water to the mixture or by adding acetone to a mixture containing water as well as cyclohexane and distilling. By the maintenance of a relatively small amount of water in the acetone-cyclohexane-containing mixture, the ratio of acetone to cyclohexane in the distillate is changed appreciably, and advantageously, so that a more efficient separation is possible than when acetone alone is utilized in the process.

The addition of water raises the cyclohexane concentration and lowers the acetone concentration as indicated in the following table giving the compositions of cyclohexane-acetone mixtures with and without added substances:

TABLE I

Distillation of cyclohexane-acetone mixtures

| Wt. per cent $C_6H_{12}$ | Per cent acetone | Percent third substance | B. P. | |
|---|---|---|---|---|
| 32.7 | 67.3 | None | 53.1 °C. | ±0.5 |
| 41.5 | 55.5 | 3.0 $H_2O$ | 52.2 | ±0.5 |

From the table above it will be observed that the proportion of cyclohexane in the distillate is increased over that in the acetone binary and inasmuch as water may subsequently be employed to separate the cyclohexane from the acetone by extraction, the presence of water in the original distillate adds no complicating factor and is, as a matter of fact, of great advantage in increasing the efficiency of operation. Less acetone is required for the distillation, thereby reducing the quantity necessary to be recovered.

Although the proportions of water to the mixture of cyclohexane and acetone may vary over a considerable range, I have found that the greatest efficiency of operation may be obtained by using from 3–5% water, based upon the volume of the cyclohexane-acetone mixture, greater quantities not being soluble in the acetone-hydrocarbon system, and smaller quantities not giving the maximum increase of cyclohexane content in the cyclohexane azeotrope. Preferably there should be at least 1.3 parts of acetone per part of cyclohexane, and at least 0.01 part of water per part of cyclohexane.

The general technique described in my prior application Serial No. 317,531 may be followed in the operation of the present invention, the prime difference existing between the present invention and that described in my prior application being in the addition of a relatively small amount of water to the cyclo-hexane-acetone-containing mixture. Thus, when treating cyclo-hexane-benzene mixtures for recovery of benzene or cyclohexane, or both, each in the pure form, acetone may be added to the cyclohexane-benzene mixture together with a small amount of water, and the mixture thereafter distilled. The excess acetone distills following the acetone-cyclohexane-water azeotrope but at a higher temperature, and finally benzene in the pure form is obtained. The acetone-cyclohexane-water ternary is then processed with water.

This process preferably involves water-washing of the ternary which is carried out by conducting the ternary to the bottom of a baffle tower down which water is flowing. The counter-current flow of water and binary affects solution of acetone in water and release of the cyclohexane which rises to the top of the tower and is removed by decantation. The acetone dissolved in the water may be recovered for further use by distillation from its mixture with water. The cyclohexane may be obtained chemically pure by removing the traces of residual water by distillation or by the use of common drying agents.

The process as above described may be applied to any mixture of compounds containing cyclohexane, provided the boiling temperatures of the additional constituents or any azeotropic mixture between such constituents or between such constituents and acetone are sufficiently remote from the boiling temperature of the cyclohexane-acetone water ternary. In certain cases involving constituents, part of which are water soluble, water extraction may be substituted for distillation. None of these preliminary treatments are necessary, however, in the following illustrative case, the technique of which I have successfully employed in conjunction with a process for the simultaneous manufacture of acetone and cyclohexane by exchange of hydrogen between isopropanol and benzene described in copending application of E. P. Bartlett, Serial No. 265,932.

As a process of this type involves an equilibrium, the product is a mixture of isopropanol, acetone, benzene and cyclohexane. Such a mixture contains constituents for forming at least three different azeotropic mixtures, benzene-isopropanol (B. P. 71.9°), cyclohexane-isopropanol (B. P. 68.6°), both of which are revealed in the literature, and acetone-cyclohexane (B. P. 53.1°). From such a mixture cyclohexane can be removed quantitatively as its azeotrope with acetone. The efficiency of the process is, as indicated above, greatly improved by the presence of small amounts of water. The acetone-cyclohexane mixture is then separated into its constituents by countercurrent water extraction such as previously outlined, or by some other convenient, well known device. Acetone is recovered from the water solvent by simple distillation. The cyclohexane is dried either by a suitable drying agent or by a process of distillation which takes advantage of the convenient cyclohexane-water pseudo-azeotrope.

Following the removal of cyclohexane, the residual mixture of acetone, isopropanol and benzene is topped to remove acetone, and the unconverted benzene and isopropanol are returned to the hydrogenation unit for reprocessing.

While I have illustrated my invention by certain applications, I do not limit my claims to such specific cases, for there are many possible problems of separation where solutions may employ as a basic principle the recovery of cyclohexane from mixtures by means of its azeotrope with acetone and water.

I claim:

1. A method for the removal of cyclohexane from admixture with benzene which comprises treating the cyclohexane-containing mixture with acetone and water in the ratio of at least 1.3 parts of acetone per part of cyclohexane and at least 0.01 part of water per part of cyclohexane and thereafter distilling off the resultant cyclohexane-acetone-water azeotrope.

2. A method for the removal of cyclohexane from admixture with benzene which comprises treating the cyclohexane-containing mixture with acetone and water in the ratio of at least 1.3 parts of acetone per part of cyclohexane and at least 0.01 part of water per part of cyclohexane and thereafter distilling off the resultant cyclohexane-acetone-water azeotrope and thereafter removing the cyclohexane by treating the resultant distillate with water.

EDMUND FIELD.

CERTIFICATE OF CORRECTION.

Patent No. 2,302,608.   November 17, 1942.

EDMUND FIELD.

It is hereby certified that error appears in the printed specification of the above numbered patent requiring correction as follows: Page 1, second column, lines 35 and 36, for "my prior application Serial No. 317,531" read --U. S. Patent 2,212,810--; lines 41 and 42, for "cyclo-hexane" read --cyclohexane--; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.